3,467,713
PROCESS FOR THE DEFLUORINATION OF FLUOROSTEROIDS
Lawrence H. Knox, deceased, late of Mexico, Mexico, by Anne A. Knox, legal representative, Mexico, Mexico, assignor to Syntex Corporation, Panama, Panama, a corporation of Panama
No Drawing. Filed Sept. 2, 1966, Ser. No. 577,084
Claims priority, application Mexico, Oct. 8, 1965, 85,123
Int. Cl. C07c *167/00, 169/14, 169/26*
U.S. Cl. 260—586
7 Claims

ABSTRACT OF THE DISCLOSURE

Defluorination of fluoro steroids by heating with lithium aluminum hydride in an ether solvent.

---

The present invention relates to a process for preparing cyclopentanoperhydrophenanthrene derivatives.

In particular, this invention pertains to a process for reducing primary secondary or tertiary fluoro steroids, so as to yield the corresponding desfluoro compounds.

As is well known alicyclic and aliphatic fluorides, either primary, secondary or tertiary, are resistant, under normal conditions, to dehalogenation with lithium aluminum hydride. The sole reactions are thus reduction of keto groups and/or saponification of acyloxy groups, without any elimination of the fluorine present in the molecule. This is also true in the case of fluorosteroids.

In accordance with the present invention, the discovery has been made that fluorosteroids, when refluxed for a prolonged period of time with an excess of lithium aluminum hydride in an ether solvent having a relatively high boiling point are dehalogenated in very good yields, with substitution of the fluorine atom by hydrogen, regardless of whether the fluorine atom is primary, secondary or tertiary.

The reaction is effected using preferably equal parts of hydride and fluorosteroid, but larger or smaller amounts of reagent may also be used. During the reaction, reduction of keto or aldehyde groups present in the fluorosteroid and hydrolysis of ester groups also occur.

As previously indicated, the process of the present invention is conducted at the reflux temperature of an ether solvent having a relatively high boiling point, that is from about 50 to about 260° C. Preferably diglyme as solvent, but other ethers such as dioxane, tetrahydrofuran, dowanol, anisol, n-butylether, benzofuran, phenylether and the like may also be used.

The reaction may also be conducted in the presence of catalytic amounts of Lewis acids, such as borontrifluoride etherate, aluminum chloride, antimony pentachloride, etc.

The reflux time is generally from about 3 to about 24 hours, depending upon the type of fluorinated compound used as starting material, as well as the reaction temperature. In general, a steroid having a primary fluorine atom will be defluorinated more readily than another whose fluorine atom is secondary or tertiary. When tetrahydrofuran or dioxane is used as a solvent, the reflux time will be on the order of 18 to 24 hours, while in the case in which diglyme or anisol is used, a 10 to 15 hour reflux is sufficient.

The starting materials used for the process of the present invention are steroids of the androstane, pregnane, estrane, cholestane or sapogenin series, possessing fluorine atoms in one or several positions of the steroid molecule or side chain. Thus for example, the method is applicable to steroids fluorinated at C–2, C–3, C–4, C–6, C–7, C–9, C–12, C–15, C–16, C–17 and C–21. Examples of suitable starting materials are 3α-fluoro-5α-androstan-17-one, 2α-fluorotestosterone, 6β-fluorotestosterone, 16α-fluorotestosterone, B-homo-7-fluoro-$\Delta^{5(10)}$-19-norandrosten-3β-ol-17-one acetate, 6α-fluoromethylprogesterone, 6α,9α-difluoro-17,20;20,21-bis-methylenedioxy - $\Delta^4$ - pregnen - 11B - ol-3-one, B-homo-7-fluoro-19-nor-$\Delta^4$-pregnene - 3,20 - dione, 6α-fluoroprogesterone, 17α-fluoroprogesterone, 21-fluoroprogesterone, and the like.

Example 1

To a suspension of 500 mg. of lithium aluminum hydride in 50 cc. of dry diglyme there was added a solution of 500 mg. of B-homo-7-fluoro-$\Delta^{5(10)}$-19-norandrosten-3β-ol-17-one acetate. The mixture was refluxed under anhydrous conditions for 13 hours. At the end of this time, the reaction mixture was cooled and the excess hydride was destroyed by careful addition of ethyl acetate. Saturated sodium sulfate solution and solid sodium sulfate were next added and the inorganic material was filtered off and washed well with hot ethyl acetate. The filtrates were combined and the combined extracts evaporated to dryness under vacuo. Upon crystallization of the residue from acetone there was obtained B-homo-19-nor-$\Delta^{5(10)}$ - androstene - 3β,17β - diol, M.P. 159–160° C.; $[\alpha]_D$ —120° (CHCl$_3$). The elemental analysis confirmed that the product did not contain fluorine.

Example 2

A mixture of 4.64 g. of B-homo-7-fluoro-19-nor-$\Delta^4$-pregnene-3,20-dione, 270 cc. of diglyme and 4.64 g. of lithium aluminum hydride was refluxed for 13 hours, isolating the product in accordance with the technique described in Example 1. The resultant oily product (4.5 g.) was dissolved in 40 cc. of dioxane and 1.1 molar equivalents of 2,3-dichloro-5,6-dicyano-1,4-benzoquinone were then added. The mixture was stirred at room temperature for 3 hours and the hydroquinone formed during the reaction was filtered off. The filtrate was evaporated to dryness and the residue dissolved in acetone and filtered through 80 g. of alumina. The eluates were evaporated to dryness and the residue dissolved in 25 cc. of acetic acid and treated under stirring, at 15–20° C., with 1.1 molar equivalents of chromic acid in 15 cc. of 80% acetic acid. This reaction mixture was allowed to stand at room temperature for 1 hour and then poured into ice water. The solid which formed was collected by filtration, washed well with water and air dried. Upon crystallization from methanol there was obtained B-homo-$\Delta^4$-19-norpregnene-3,20-dione, with M.P. 146–147° C.; $[\alpha]_D$ —46° (CHCl$_3$)λ max. 242 mμ log ε 4.22.

Example 3

A mixture of 1.2 g. of 3α-fluoro-5α-androstan-17-one, 100 cc. of diglyme and 1.2 g. of lithium aluminum hydride was refluxed for 13 hours. The product was isolated in accordance with the technique described in Example 1, and then recrystallized from methanol, to afford 5α-androstan-17β-ol, M.P. 168–170° C., identical to an authentic sample.

Example 4

Example 1 was repeated but substituting dowanol for diglyme and prolonging the reaction time to 18 hours. substantially the same results were obtained.

Example 5

Example 3 was repeated, using dioxane however as the solvent and prolonging the reflux to 24 hours. 5α-androstan-17β-ol was obtained in similar yield.

Example 6

Anisol was substituted for diglyme in the method of Example 1. Sustantially the same results were obtained.

Example 7

A mixture of 1 g. of 21-fluoroprogesterone in 50 cc. of anhydrous dioxane and 1 g. of lithium aluminum hydride was refluxed for 8 hours under anhydrous conditions. The product was isolated in accordance with the technique described in Example 1. The oily product thus obtained ($\Delta^4$-pregnene-3,20-diol) was dissolved in 20 cc. of acetone, the mixture was cooled to 0° C. and treated under an atmosphere of nitrogen and with stirring, with a solution of 8 N chromic acid (prepared by mixing 26 g. of chromium trioxide with 23 cc. of concentrated sulfuric acid and diluting with water to 100 cc.), until the color of the reagent persisted in the mixture. The mixture was stirred for 5 minutes further at 0–5° C. and diluted with water. The solid was collected, washed with water and dried under vacuum. Upon crystallization from acetone-hexane there was obtained progesterone, identical to an authentic sample.

Example 8

A solution of 500 mg. of 17α-fluoro-progesterone in 25 cc. of anisol was added to 500 mg. of lithium aluminum hydride in 25 cc. of anisol. This mixture was refluxed for 20 hours under anhydrous conditions. The $\Delta^4$-pregnene 3,20-diol thus formed was then isolated in accordance with the technique described in Example 1, and the crude product was oxidized in accordance with the method of the preceding Example 7 to yield progesterone.

Example 9

In accordance with the method described in Example 1, the compounds mentioned below under (I) were converted into the compounds listed under (II):

| (I) | (II) |
| --- | --- |
| 6β-fluorotestosterone | $\Delta^4$-androstene-3,17β-diol |
| 16α-fluorotestosterone | $\Delta^4$-androstene-3,17β-diol |
| 4β-fluoro-$\Delta^2$-androsten-17β-ol | $\Delta^2$-androsten-17-ol |
| 2α-fluoro-$\Delta^3$-androsten-17β-ol | $\Delta^3$-androsten-17β-ol |
| 2β-fluoro-5α-androstan-3α-ol-17-one | 5α-androstane-3α,17β-diol |
| 12α-fluoropregnane-11β,17α-diol-3,20-dione | pregnane-3β,11β,17α,20-tetrol |
| 15β-fluoro-$\Delta^4$-pregnene 3,11,20-trione | $\Delta^4$-pregnene-3,11β,20-triol |
| 4α-fluoroprogesterone | $\Delta^4$-pregnene-3,30-diol |

Example 10

A mixture of 1 g. of 17,20;20,21-bismethylenedioxy-9α-fluoro-$\Delta^4$-pregnen-11β-ol-3-one in 25 cc. of tetrahydrofuran and 1 g. of lithium aluminum hydride in 40 cc. of tetrahydrofuran was refluxed under anhydrous conditions for 24 hours. The product was isolated in accordance with the technique described in Example 1, thus obtaining 17, 20;20,21-bismethylenedioxy-$\Delta^4$-pregnene - 3,11β - diol which was oxidized with 2,3-dichloro-5,6-dicyano-1,4-benzoquinone in accordance with the method described in Example 2, to yield as final product 17,20;20,21-bismethylenedioxy-$\Delta^4$-pregnen-11β-ol-3-one, identical to an authentic sample.

The same product was obtained when 17,20;20,21-bismethylenedioxy-6α,9α-difluoro-$\Delta^4$-pregnen - 11β - ol - 3-one was employed as the starting material.

Example 11

Example 1 was repeated, adding 0.1 g. of aluminum chloride to the reaction mixture. The same results were obtained.

Example 12

Example 3 was repeated, adding 0.3 cc. of borontrifluoride etherate to the reaction mixture. The same results were obtained.

Example 13

A solution of 1 g. of 4β-fluoro-$\Delta^2$-androsten-17β-ol in 20 cc. of tetrahydrofuran was added to 500 mg. of lithium aluminum hydride in 10 cc. of tetrahydrofuran. The mixture was refluxed for 18 hours under anhydrous conditions and the product was then isolated in accordance with the technique described in Example 1, thus obtaining $\Delta^2$-androsten-17β-ol, identical to that obtained in Example 9.

What is claimed is:

1. A process for defluorinating fluorosteroids, which comprises heating a fluorosteroid with lithium aluminum hydride in an ether solvent at a temperature from about 50° to about 260° C. from about 3 to about 24 hours.

2. The process in accordance with claim 1 wherein the fluorine atom in the fluorosteroid is primary.

3. The process in accordance with claim 1 wherein the fluorine atom in the fluorosteriod is secondary.

4. The process in accordance with claim 1 wherein the fluorine atom in the fluorosteroid is tertiary.

5. The process in accordance with claim 1 wherein the reaction is effected in the presence of a Lewis acid as catalyst.

6. The process in accordance with claim 1 wherein the ether solvent is diglyme and the reaction is conducted at the reflux temperature of the reaction mixture.

7. The process in accordance with claim 6 wherein the fluorosteroid is a B-homo-7-fluorosteriod.

References Cited

FOREIGN PATENTS 501,945   4/1954   Canada.

LEWIS GOTTS, Primary Examiner

E. C. LOVE, Assistant Examiner

U.S. Cl. X.R.

260—239.55, 397.3, 397.5, 617